United States Patent
Moe et al.

(10) Patent No.: US 7,588,212 B2
(45) Date of Patent: Sep. 15, 2009

(54) METHOD AND APPARATUS FOR NOISE ABATEMENT AND ICE PROTECTION OF AN AIRCRAFT ENGINE NACELLE INLET LIP

(75) Inventors: Jeffrey W. Moe, Chula Vista, CA (US); John J. Wunsch, San Diego, CA (US); Michael S. Sperling, Chula Vista, CA (US)

(73) Assignee: Rohr Inc., Chula Vista, CA (US)

( * ) Notice: Subject to any disclaimer, the term of this patent is extended or adjusted under 35 U.S.C. 154(b) by 1217 days.

(21) Appl. No.: 10/615,673

(22) Filed: Jul. 8, 2003

(65) Prior Publication Data

US 2005/0006529 A1    Jan. 13, 2005

(51) Int. Cl.
    *B64D 15/12*    (2006.01)
(52) U.S. Cl. .................................. 244/134 D
(58) Field of Classification Search ............. 244/134 D, 244/134 R
    See application file for complete search history.

(56) References Cited

U.S. PATENT DOCUMENTS

| | | | | |
|---|---|---|---|---|
| 2,496,279 | A | * | 2/1950 | Ely et al. ..................... 219/528 |
| 2,791,668 | A | * | 5/1957 | Cowdrey et al. ............ 219/528 |
| 2,967,415 | A | * | 1/1961 | Ford et al. .................... 66/193 |
| 3,420,476 | A | * | 1/1969 | Schultz et al. ........... 244/134 D |
| 3,657,514 | A | * | 4/1972 | Adams ....................... 219/201 |
| 3,800,121 | A | * | 3/1974 | Dean et al. .................. 219/202 |
| 4,291,079 | A | | 9/1981 | Hom |
| 4,514,619 | A | * | 4/1985 | Kugelman .................. 219/483 |
| 4,743,740 | A | | 5/1988 | Adee |
| 5,041,323 | A | | 8/1991 | Rose et al. |
| 5,131,812 | A | * | 7/1992 | Boyd et al. .................... 416/95 |
| 5,653,836 | A | | 8/1997 | Mnich et al. |
| 5,686,003 | A | * | 11/1997 | Ingram et al. ............... 219/201 |
| 5,702,231 | A | | 12/1997 | Dougherty |
| 5,749,546 | A | | 5/1998 | Blackner et al. |
| RE36,215 | E | | 6/1999 | Rosenthal |
| 6,027,075 | A | | 2/2000 | Petrenko |
| 6,454,219 | B1 | | 9/2002 | Moe |
| 2002/0139900 | A1 | | 10/2002 | Porte et al. |

FOREIGN PATENT DOCUMENTS

| | | |
|---|---|---|
| EP | 0 913 326 A2 | 8/1998 |
| EP | 1 103 462 A1 | 11/2000 |
| EP | 1 232 945 A1 | 2/2002 |

* cited by examiner

*Primary Examiner*—Tien Dinh
(74) *Attorney, Agent, or Firm*—Goodwin Procter LLP (57) ABSTRACT

An aircraft engine nacelle comprises: (a) an inlet lip and a skin having internal and external surfaces; (b) a noise abatement structure such as an acoustic panel located on the internal surface of the nacelle skin; and (c) an electrically powered de-icing system located on the external surface of the nacelle skin and in electrical connection to a power source. A method for de-icing and abating noise from an aircraft nacelle comprises: (a) providing a noise abatement structure such as an acoustic panel located on the internal surface of the nacelle skin; (b) providing an electrically powered de-icing system on the external surface of the nacelle skin; and (c) applying an electric current to the electrically powered de-icing system. The nacelle skin may be a perforated skin, and the de-icing system comprises a wire mesh bonded to the external surface of the perforated skin. The method and nacelle permit the use of noise abatement structures such as acoustic panels for noise reduction while advantageously avoiding detrimental high temperatures associated with conventional de-icing systems.

14 Claims, 4 Drawing Sheets

METHOD AND APPARATUS FOR NOISE ABATEMENT AND ICE PROTECTION OF AN AIRCRAFT ENGINE NACELLE INLET LIP

BACKGROUND OF THE INVENTION

1. Field of the Invention

This invention relates to an apparatus and method for reducing the noise of an aircraft gas turbine engine, while at the same time improving de-icing and anti-icing performance in the area of the aircraft engine's nacelle. More particularly, this invention relates to a method and apparatus for reducing noise generated by the fan section of the aircraft engine and concurrently employing a low power electrical ice protection system to minimize ice formation on the nacelle inlet and remove any ice formed on the nacelle inlet. One or more sound-absorbing or noise abatement structures are employed at the inner surface of the nacelle inlet lip to reduce noise. The use of the low power electrical ice protection system enables the use of such structures for noise abatement in the inlet lip area while simultaneously permitting the installation and use of necessary ice protection equipment on the nacelle inlet.

2. Background Information

The desirability of reducing the noise generated by an aircraft is well-known to those skilled in the art. As discussed, for example, in U.S. Pat. No. 5,749,546, both the airplane's airframe and engine produce varying amounts of objectionable audible noise during departure and approach conditions. Aircraft engine fan noise may be suppressed at the engine nacelle inlet with a noise absorbing liner, which converts acoustic energy into heat. The liner normally consists of a porous skin supported by a honeycomb backing to provide the required separation between the porous skin and a solid backskin. This provides very effective and widely accepted noise suppression characteristics. Aircraft engines with reduced noise signatures are mandated by government authorities, and as a result, are demanded by aircraft manufacturers, airlines and local communities.

In addition, the protection of surfaces critical to the safe functioning of an aircraft during flight in icing conditions is a regulated requirement. Both the wing and the engine nacelle leading edges are similar in shape and construction, and in many aircraft designs require ice protection. With respect to the engines, ice breaking away from the engine inlet can damage various components if ingested into the engine. The formation of ice in this region also constricts the flow of air into the engine, causing losses of performance and potential engine malfunction. As a result, ice protection systems for the nacelle in general, and the engine inlet portion in particular, are needed.

In the prior art, methods for providing ice protection vary. The aircraft industry typically utilizes an ethylene glycol de-icing solution to melt the ice on the aircraft wing while the aircraft is on the ground awaiting departure. This is an expensive procedure, which may require repeated application of the glycol solution. Alternatively, a rubber tube aligned along the leading edge surface of the wing may be periodically inflated to break any ice on the wing. Most high-speed aircraft direct hot gases from the jet engine compressor onto the wing or nacelle inlet leading edges to melt the accreted ice. This option is not available for aircraft that do not have jet engines, or aircraft limited in the amount of hot air that can be bled off the engine.

U.S. Pat. No. 6,027,075 describes a system for modifying the adhesion strength of ice adhered to an object. The system includes an electrode that is electrically insulated from the object, and a direct current source coupled to the object and the electrode to generate a direct current bias to an interface between the ice and the object. The direct current bias has a voltage that modifies the ice adhesion strength selectively. The electrode may include a grid electrode shaped to conform to a surface of the object. Each point of the grid electrode is in electrical contact with the source.

One example of an aircraft engine nacelle ice protection system that uses hot air bleed from the compressor stage of the turbofan engine and routes the air to the leading edge surface is the ROHRSWIRL™ system described, for example, in U.S. Pat. No. RE 36,215. In this system, tubes or ducts direct hot air from the compressor section of the engine into the D-duct, which is the cavity formed by the nacelle leading edge skin and the inlet forward bulkhead. Hot air is circulated around the perimeter of the structure and exits at a lower vent. A control valve within the system provides the means for commanding the delivery of bleed air when the ice protection system is required.

However, the use of engine bleed air for ice protection can negatively impact engine performance, and dictates that additional engine nacelle design requirements and conditions be considered. Utilizing compressed air for ice protection is an energy loss and results in propulsion system inefficiency. Modern turbofan engines increase thrust levels by increasing the by-pass ratio, i.e. the amount of fan flow divided by the amount of core flow. To do this, fan diameters have been increased, thus resulting in a larger D-duct volume and a greater surface area requiring ice protection capability. At the same time, the availability of core compressor air for de-icing and anti-icing has been decreased. The resulting requirement of hot air ice protection systems is a significant performance penalty incurred by the engine on take-off.

Furthermore, because the ducting that carries the hot bleed air passes through various engine compartments on its way to the D-duct, consideration must be given to duct failure modes, which requires that pressure relief doors be added. Additionally the surrounding structure must be able to operate at high temperatures. Consideration must also be given to the use of materials having different coefficients of thermal expansion. Material selection for the inlet lip assembly must take into account the conditions of a high temperature and pressure environment, plus the need for structural integrity in the event of a bird strike or other foreign object damage. The bulkhead is typically made from nickel-based INCONEL® alloys or titanium alloys, with the lipskin being made from a high temperature aluminum alloy. The lip assembly interfaces with the outer barrel and inner acoustic bond panel, which can be manufactured from either a composite or aluminum material. Where these materials join together, care must be taken to account for the differing coefficients of thermal expansion, the conduction of heat into lower temperature resistant structures, as well as galvanic corrosion requirements, as are well understood by those skilled in the art.

In view of the foregoing, it is necessary to both suppress noise at the engine nacelle inlet and provide sufficient ice protection capability for the leading edges of the nacelle. However, the portion of the engine nacelle inlet lip available for acoustic treatment is currently limited to the inner barrel structure aft of the inlet lip, due mainly to the incompatibility of the prior art hot air de-icing systems with the relatively low temperature capability of existing, adhesively bonded honeycomb noise abatement structures. There is a lack of current technology that provides a satisfactory method for extending such engine noise reduction structures into the nacelle lip while concurrently satisfying the temperature constraints of the noise abatement treatment. Thus, there is a need in the art for a method and apparatus that satisfies the requisite nacelle inlet ice protection requirements while at the same time permitting the use of noise abatement structures within the nacelle inlet lip to achieve the noise reduction required of modern gas turbine powered aircraft.

SUMMARY OF THE INVENTION

It is one object of this invention to provide a noise abatement structure in the nacelle inlet lip of a gas turbine engine, in combination with an electrical ice protection system. It is a feature of this invention that the desired noise abatement and ice protection capabilities may be achieved by a unique approach that provides material temperature compatibility through the combination of an electrically powered ice protection system located on the nacelle inlet lip skin, wherein the surface of the inlet lip skin is an acoustically porous skin of a honeycomb core noise abatement structure.

This invention advantageously increases the amount of acoustic treatment that may be applied to the nacelle inlet area, for maximizing noise reduction. Use of the invention also permits the power plant designer to reduce the inlet structure weight, by shortening the inlet structure. This may be done because use of the invention allows more sound suppression panels to be incorporated into the nacelle, per unit length of the nacelle, than do prior art ice protection systems. Accordingly, if the power plant designer wishes to build a nacelle with the same amount of sound suppression panel as a prior art nacelle, by using the present invention the length of the nacelle may be reduced, which in turn reduces the weight of the nacelle. Additionally, a reduced length nacelle allows the fan case to be smaller, and lighter.

A further advantage of this invention results from the increasing desire in the industry to make nacelle de-icing and anti-icing systems completely electrically powered. Although current nacelle systems often employ engine bleed air for de-icing, hydraulics for thrust reverser actuation, and multiple electronic sub-systems, future designs will benefit by replacing hot air systems with electrical ice protection systems to improve engine power efficiency, and replace hydraulic actuators with electric actuators to reduce weight. The method and apparatus of this invention provide an electric de-icing and anti-icing solution to accomplish at least a portion of this goal, and also provide the acoustic and weight savings benefits discussed above, as well as additional positive features and advantages as discussed below.

Accordingly, it is another object of the invention to provide an acoustic panel for use in the inlet lip portion of a gas turbine nacelle. The panel is comprised of a solid back skin, an acoustically permeable front skin, and a honeycomb cell structure therebetween. An ice protection system is adhered to the front skin, and the ice protection system includes an acoustically permeable and electrically and thermally conductive structure. The ice protection system may be connected to an electric power source via wiring or other conventional techniques. The honeycomb structure is thermally insulated from the permeable front skin.

It is another object of this invention to provide an aircraft gas turbine engine nacelle with improved ice protection and acoustic performance characteristics. The nacelle has an inlet lip comprising an acoustic panel structure including a solid back skin, an acoustically permeable front skin, and a honeycomb cell structure therebetween, and the inlet lip further comprises an ice protection system on the front skin of the panel. The ice protection system includes an acoustically permeable and electrically and thermally conductive structure in connection with an electric power source, and thermally insulated from the permeable front skin.

By employing a low power electrically powered ice protection system, the area available for application of the noise abatement structure (e.g. honeycomb panel) may be increased while avoiding the temperature concerns typically associated with combining such a noise abatement structure in proximity to a conventional hot air de-icing and anti-icing system. Moreover, there is advantageously no required increase to the inlet length to accommodate placement of the noise abatement structure to achieve noise suppression; thus the associated weight and cost penalties associated with such an inlet length increase are advantageously avoided.

Alternatively, if the external nacelle surfaces are initially sized assuming the use of no noise abatement structure in the inlet lip area, using the present invention it is possible to actually reduce the length of the inlet, because application of this invention permits the use of a noise abatement structure within the nacelle inlet lip, thus reducing the barrel length required for application of the noise abatement structure to achieve noise reduction, thereby permitting reduction of the barrel length via subsequent modification. This optimization or reduction in length is desirable for the following reasons: first, shortening the inlet provides a decrease in weight; second, a shorter inlet will reduce external drag and improve fuel consumption; and third, less material costs are incurred.

Furthermore, the use of an electrically powered ice protection system, rather than a hot air system, eliminates the need for pressure relief doors in both the fan and inlet cowls (depending on engine configuration), thereby providing additional weight and cost benefits. Moreover, hot air de-icing systems typically employ pneumatic valves to deliver the hot air to the appropriate location. Eliminating the use of such pneumatic valves eliminates the need for devices that are frequently removed for service or replacement. Pneumatic valves remain the primary field problem causing system failure for hot air de-icing systems, resulting in high warranty returns and customer frustration due to the lack of valve reliability. In addition, the weight and cost associated with the use of such valves is advantageously eliminated.

This invention is also useful on any aircraft structure upon which water impinges and can form ice, such as the engine nose cap, inner guide vanes (both fixed and variable), and forward fan guide vanes, as will be well understood by those skilled in the art. It may also be used on airframe structures such as aircraft wing and tail surfaces.

DETAILED DESCRIPTION OF THE INVENTION

This invention will be further understood in view of the following detailed description.

Figure 1:
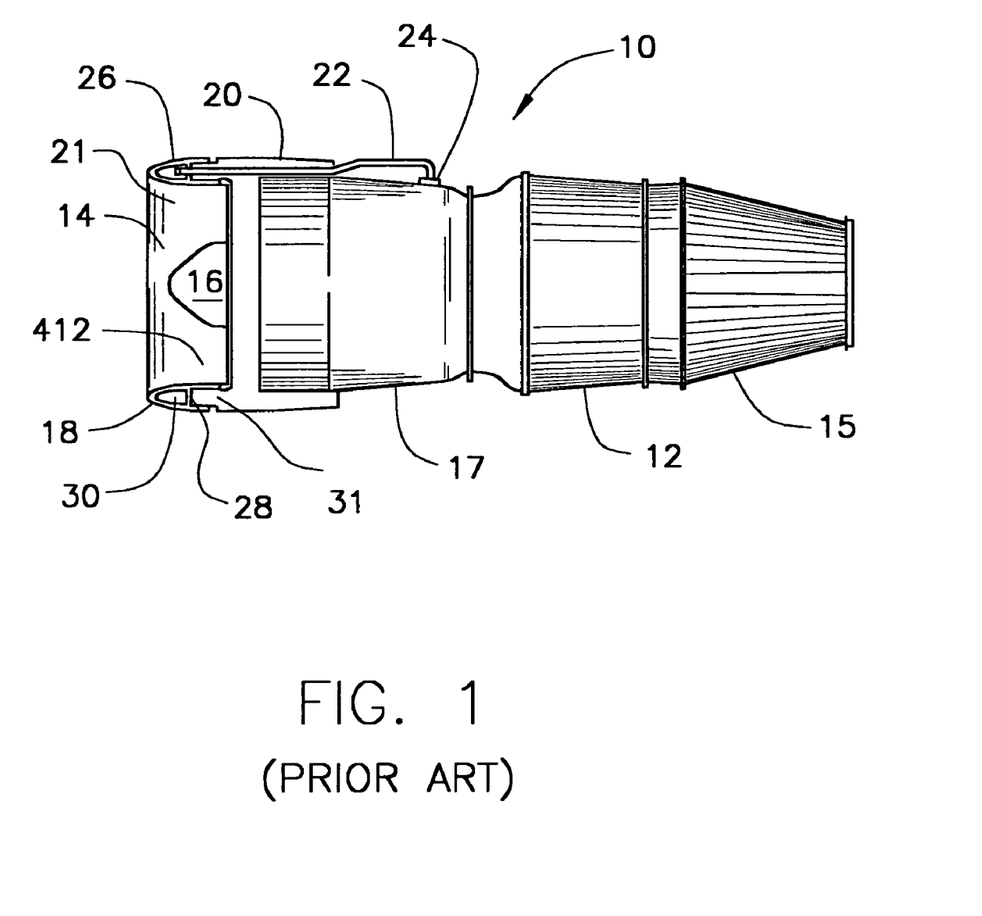
FIG. 1 is a schematic elevation view, partially in section, of a conventional gas turbine or jet engine.

Referring now to FIG. 1, which is also set forth in U.S. Pat. No. RE 36,215, there is seen a schematic representation of a high-speed jet engine 10 of the sort suitable for aircraft propulsion. Air enters through inlet section 14, between nose cap 16 and the annular housing 18, which constitutes the forward-most section of the engine nacelle 20, which includes nacelle inlet lip 21. Hot, high-pressure propulsion gases pass through exhaust assembly 15 and out the rear of the engine.

In flight, under certain temperature and humidity conditions, ice may form on the nacelle inlet lip 21, which is the leading edge of annular housing 18, and on the nose cap 16. The ice changes the geometry of the inlet area between annular housing 18 and nose cap 16, adversely affecting the quantity and flow path of incoming air. Also, pieces of ice may periodically break free from these components and enter the engine, damaging rotor blades and other internal engine components.

Within compressor section 17, there is a region containing hot, high-pressure gases. In the prior art, a conduit or tube 22 is connected at a first end 24 to that hot, high-pressure region. The other end 26 of tube 22 passes through a bulkhead 28 at the back of annular housing 18. An annular space or D-duct 30 is defined by bulkhead 28 and annular housing 18. Bulkhead 28 separates D-duct 30 from the interior portion 31 of the inner barrel 412. In prior art ice protection systems, the tube 22 delivers hot gases into the annular space 30. Even with complex ducting arrangements within the annular housing 18, heating of the inlet lip 21 using such systems is not entirely uniform, and cold spots tend to accumulate ice. In some prior art systems, a large number of tubes 22 are required to bring sufficient hot air forward. The additional tubes add considerable weight and are not completely successful in eliminating overly hot and cold areas. Accordingly, ice protection systems of the type exemplified by FIG. 1 are inferior compared to the systems of the present invention, as described herein.

Figure 2A:
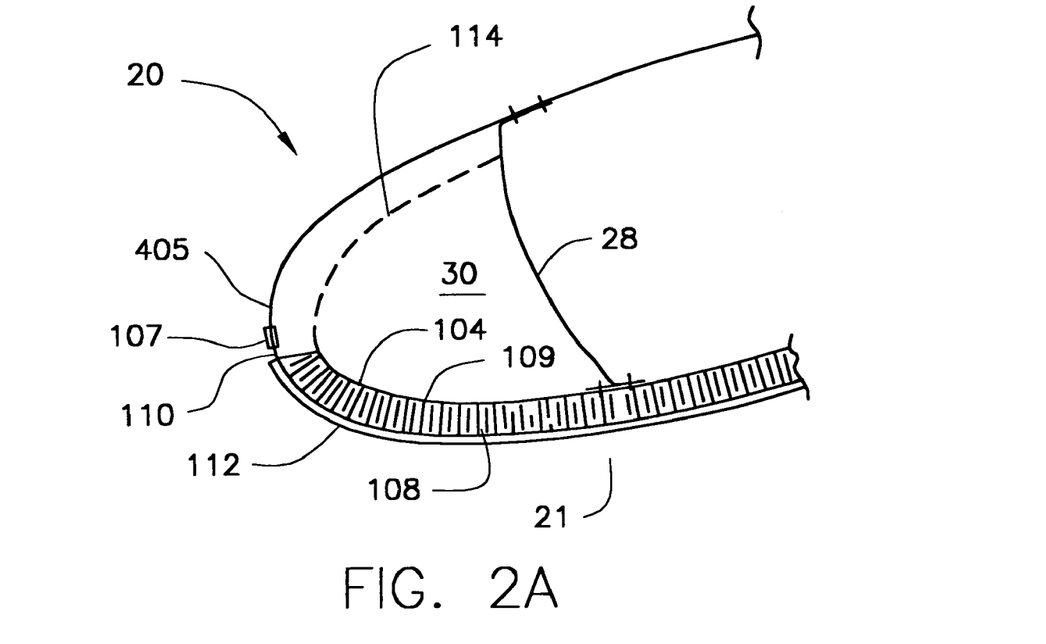
FIG. 2A depicts a schematic view of the preferred embodiment for the inlet lip design.

One embodiment of this invention is shown in FIG. 2A, which is a simplified schematic cross-sectional view of the inlet lip 21 of an aircraft engine nacelle 20. Bulkhead 28 and the inlet lip 21 define the D-duct 30. The inlet lip 21 includes a noise abatement structure, which in this embodiment is an acoustic panel 104 comprising a honeycomb core 108, a solid back skin 109, and an acoustically permeable front skin 110. The acoustic panel may be extended around the leading edge of the nacelle 20 (as shown in dashed lines 114 in FIG. 2A), rather than ending at or near the leading edge of the nacelle 20, as shown. A low power electronic ice protection system (referred to herein by the acronym IPS) 112 overlays the surface of the front skin 110, in the manner described below.

Figure 2B:
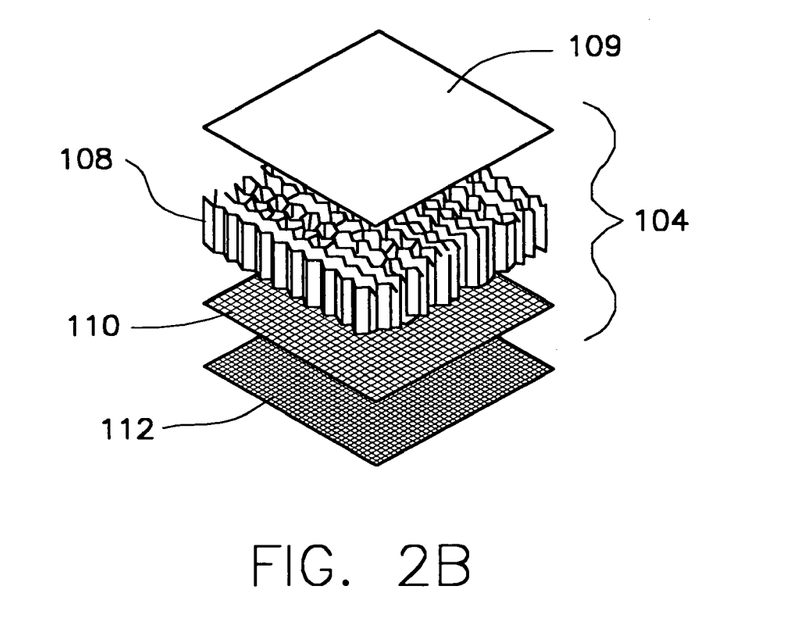
FIG. 2B depicts a schematic illustration of a nacelle noise abatement structure.

As shown in exploded view in FIG. 2B, the acoustic panel 104 comprises a honeycomb core 108, a solid back skin 109, and a perforated front skin 110. Panels of this sort are well known to those skilled in the art; see, e.g., U.S. Pat. Nos. 4,291,079; 5,041,323; and 5,653,836, the contents of which are incorporated herein by reference. The perforations in the front skin 110 are required to permit interaction between honeycomb core 108 and the sound waves generated during operation of the gas turbine engine surrounded by the nacelle 20. The honeycomb core 108 is preferably affixed via epoxy or other adhesive bonding to each of the skins 110 and 109. Preferably, the sandwich structure defined by the core 108, back skin 109, and front skin 110 is made of either metallic or non-metallic materials. In one embodiment, the skins may be an aluminum sheet. In another embodiment, the sandwich structure may be made from a graphite/epoxy laminate.

The adhesive systems used to fabricate honeycomb acoustic structures tend to exhibit long-term aging effects above about 280° F. (about 140° C.), and to fail above about 350° F. (about 180° C.). Thus, such acoustic structures generally cannot be used in the nacelle inlet lip or inlet duct areas if prior art hot air de-icing and anti-icing systems are used. Operating temperatures are typically in the 400° F. (about 205° C.) range for bleed air ice protection systems in which the bleed air is "precooled" prior to use, such as in Boeing 747 and 767 airliners; temperatures generally exceed about 750-800° F. (about 400-425° C.) if the bleed air is not precooled. The present invention uses a de-icing and anti-icing system that does not appreciably raise the temperature in the inlet lip area for extended periods of time, thereby permitting the use of adhesive bonded metallic and non-metallic acoustic sandwich structures in the nacelle inlet lip area.

In FIGS. 2A and 2B, the low power IPS 112 is affixed using conventional bonding techniques (e.g., adhesive bonding) to the outer surface of the front skin 110. The IPS 112 is connected to an electric power supply or source (not shown in FIG. 2A or 2B) by conventional means such as wiring, as will be well understood by those skilled in the art. As used herein, the term "low power" is intended to mean average electric power consumption less than about 1 watt per square inch (W/sq. in.) The electric power supply may be a conventional source such as batteries, or it may be the engine or an auxiliary power unit (APU), or a combination thereof.

The IPS 112 comprises an electrically conductive material that is permeable to sound waves, and in one particularly preferred embodiment is a fine grid stainless steel wire mesh adhesively bonded to the outer surface of the perforated skin 110. The fine grid wire mesh typically has a Rayl value between about 50-150, and preferably between about 70-110. The IPS is affixed to the skin 110 of the acoustic panel 104 in such a manner that it does not block or otherwise interfere with a significant number of perforations in the skin 110 of the acoustic panel 104. This goal may be achieved by, e.g., selecting the size, shape and configuration of the wire mesh comprising the IPS 112 vis-à-vis the size, shape and configuration of the perforation pattern in the skin 110; and by using bonding methodologies known to those skilled in the art and sufficient to minimize blocking the perforations with wire mesh and the adhesive used to affix mesh to the skin 110. In a preferred embodiment of this invention, no more that about 10% of the perforations are completely blocked; in a more preferred embodiment, no more that about 5% of the perforations are blocked; and in a most preferred embodiment, no more than about 1-2% of the perforations are blocked. The IPS 112 may extend beyond the perforated region of the front skin 110, depending upon the particular ice protection requirements involved, and may even extend over the entire outer surface of the nacelle 20. The permeable nature of the wire mesh of the IPS 112 enables the acoustic panel 104 to provide effective noise attenuation over a wide range of frequencies. Between the IPS 112 and the front skin 110 is a permeable, thermally insulating material (not shown). The insulating material prevents heat generated by the IPS during operation from raising the temperature of the skin 110 and its associated acoustic panel 104. In one embodiment, the insulating material is a layer of glass scrim. Other conventional thermally insulating materials that are also permeable to the passage of sound waves may also be used. Preferably, the insulating material is adhesively bonded to the surface of the skin 110, and the IPS 112 is adhesively bonded to the surface of the insulating material.

In the embodiment of this invention in which an IPS using DC current is employed, nacelle inlet lip areas of modern gas turbine engines can effectively be de-iced at average power levels of approximately 1 W/sq. in. or less, which is approximately one tenth to one one-hundredth of the power level required for prior art electrothermal de-icing systems.

In certain aircraft designs and aircraft engine operating conditions, aerodynamic forces, concentrated at the stagnation line of an airfoil, may hold an ice formation against the surface of the airfoil, although its adhesion to the surface has been reduced to zero. In such instances, additional ice removal techniques may be required to remove ice from such areas. In another embodiment of this invention, such an additional ice removal technique is a parting strip. As shown in FIG. 2A, parting strip 107 is preferably adhesively bonded to the front skin 110 at or near the highlight 405 of the nacelle (and over the IPS 112), where the highlight 405 is the peak of the curved section of the nacelle. Parting strip 107 comprises an electrified grid material preferably made of heavier gage wire elements as compared to the IPS 112 wire mesh, in order to conduct a higher power electrical current. In one embodiment, the strip is about 1-2 inches (about 2.5-5 cm) wide and carries a watt density of up to about 20 W/sq. in. Preferably, the strip is continually maintained at a temperature greater than about 40° F. (about 4° C.). Any liquid precipitation that impinges upon the parting strip is unable to freeze on it. Rather, it flows off the parting strip 107 and if it freezes on the acoustic panel 104, is removed as previously described. If needed, due to the design of the aircraft, parting strips may also be located at other portions of the nacelle to assist in ice removal.

A temperature sensor installed in a closed loop scheme with an electronic controller may be used to continuously adjust the power supplied to the IPS and the parting strip to maintain the surface temperature of the nacelle above about 40° F. (about 4° C.). The inlet lip skin is preferably maintained at 280° F. (about 140° C.) or less, in order to prevent any degradation to the acoustic panel, for the reasons discussed above.

The IPS also has the ability to operate as a wide-area ice detection sensor, thus providing both ice detection and ice removal. The sensor function is performed through measurement of the change in electrical impedance of the IPS 112, which is caused by the presence of ice. Any change in the impedance of the IPS 112 is measured by a system controller device (not shown), which may provide an indication of ice accumulation on the IPS 112. If the controller is appropriately configured, such indication could then, in turn, activate power to the IPS 112.

Figure 3:
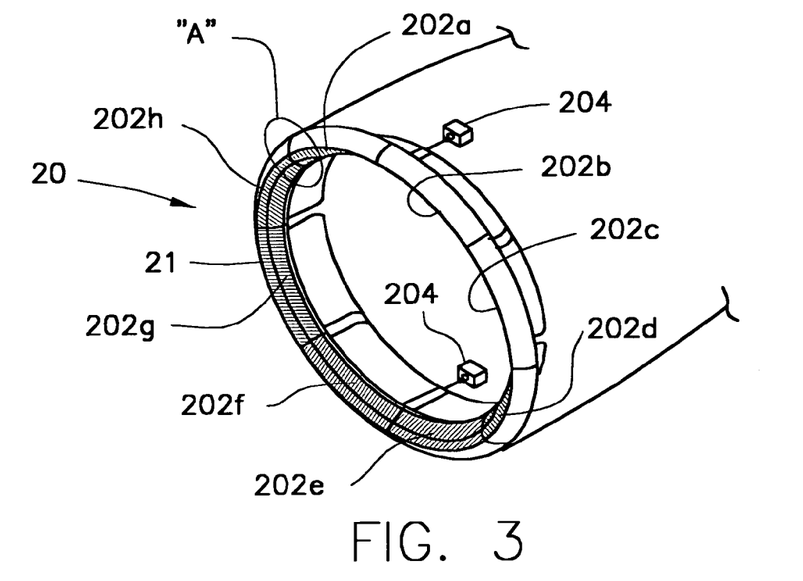
FIG. 3 depicts a front view of the wire mesh of a segmented low power electric de-icing system connected to a power supply.

In an alternate embodiment of the invention, and as shown in FIG. 3, the IPS 112 comprises a plurality of arcuate sections 202a-202h, which extend around the circumference of the inlet lip. (While FIG. 3 shows the sections extending around the entire inlet lip, they may be constructed and arranged to extend less than 360°). Power may be applied selectively or sequentially to the sections 202a-202h as required, thereby minimizing the total power consumption of the IPS 112. The power supply may be sequenced using software-based controllers 204 or other prior art devices known in the industry. Alternatively the system could be integrated into the engine's full authority digital electronic control or engine control unit (not shown in FIG. 3). Sequential or selective power application would be controlled by the appropriate control unit.

In an alternative embodiment, the IPS is powered throughout aircraft flight. In yet another embodiment, the power system for the IPS supplies high peak power pulses of energy to the IPS 112 during operation of the ice protection system. The pulsing action of the power supply rapidly raises the temperature of the ice at the interface between the ice and the IPS 112, to a temperature sufficient to cause melting of the ice at the interface. Once the ice is melted, operation of the engine (and the resulting aerodynamic and vibration forces experienced by the nacelle) causes the ice to be rapidly shed from the nacelle surface. The rapid pulsing action of the IPS 112, coupled with the insulation between the IPS 112 and the acoustic panels 104, maintain the temperature of the panels 104 within their tolerable use temperatures. Other control schemes such as alternating power to the IPS based upon a timer, etc. may also be used, as will be well understood by those skilled in the art. Useful on-off times are dependent on the environmental conditions in which the nacelle is operating, and on the particular configuration and construction of the nacelle. For one such particular combination, which is considered representative of a nacelle for a modern, high bypass gas turbine engine, cycle times of one second "power on" and thirty seconds "power off" successfully kept the inlet area free of ice.

Figure 4:
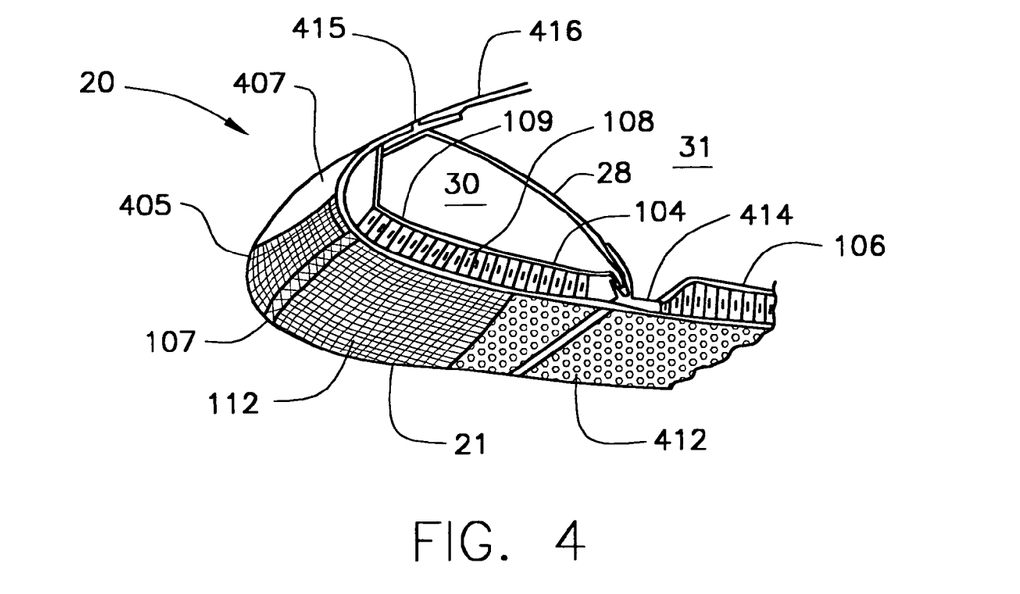
FIG. 4 depicts a respective view of the aircraft nacelle comprising the inlet lip and a low power de-icing system, in the area "A" of FIG. 3.

Reference is now made to FIG. 4, which depicts a side view of the aircraft nacelle 20 comprising inlet lip 21, and is an enlargement of portion "A" in FIG. 3. Bulkhead 28 and inlet lip 21 define the nacelle interior chamber or D-duct 30. Bulkhead 28 also separates the D-duct 30 from the interior portion 31 of inner barrel 412. An acoustic panel 104 forms the interior portion of the inlet lip 21. An IPS 112 and its associated thermal insulation layer (not shown) is affixed upon the surface of the acoustic panel (in the manner described above), and extends around inlet lip 21, approximately to the highlight 405. As previously mentioned, in other embodiments the IPS may extend entirely around the highlight 405 to the axial extent of D-duct 30. In the embodiment depicted in FIG. 4, the inner barrel 412, which is joined to the inlet lip 21 by joint 414, comprises one or more acoustic honeycomb panels 106 for noise abatement, as shown. Joint 415 joins the nacelle inlet lip 21 to the nacelle outer barrel 416. The embodiment of FIG. 4 further comprises a parting strip 107 at or near the highlight 405 of the nacelle, depending upon the location of the stagnation point of the nacelle (i.e. the point on the nacelle inlet lip at which the freestream air impacts directly upon the nacelle inlet lip, where the impacting air is stagnant). The IPS 112 and parting strip 107 are electrically connected (by means not shown) to power supplies of the type previously described.

Figure 5:
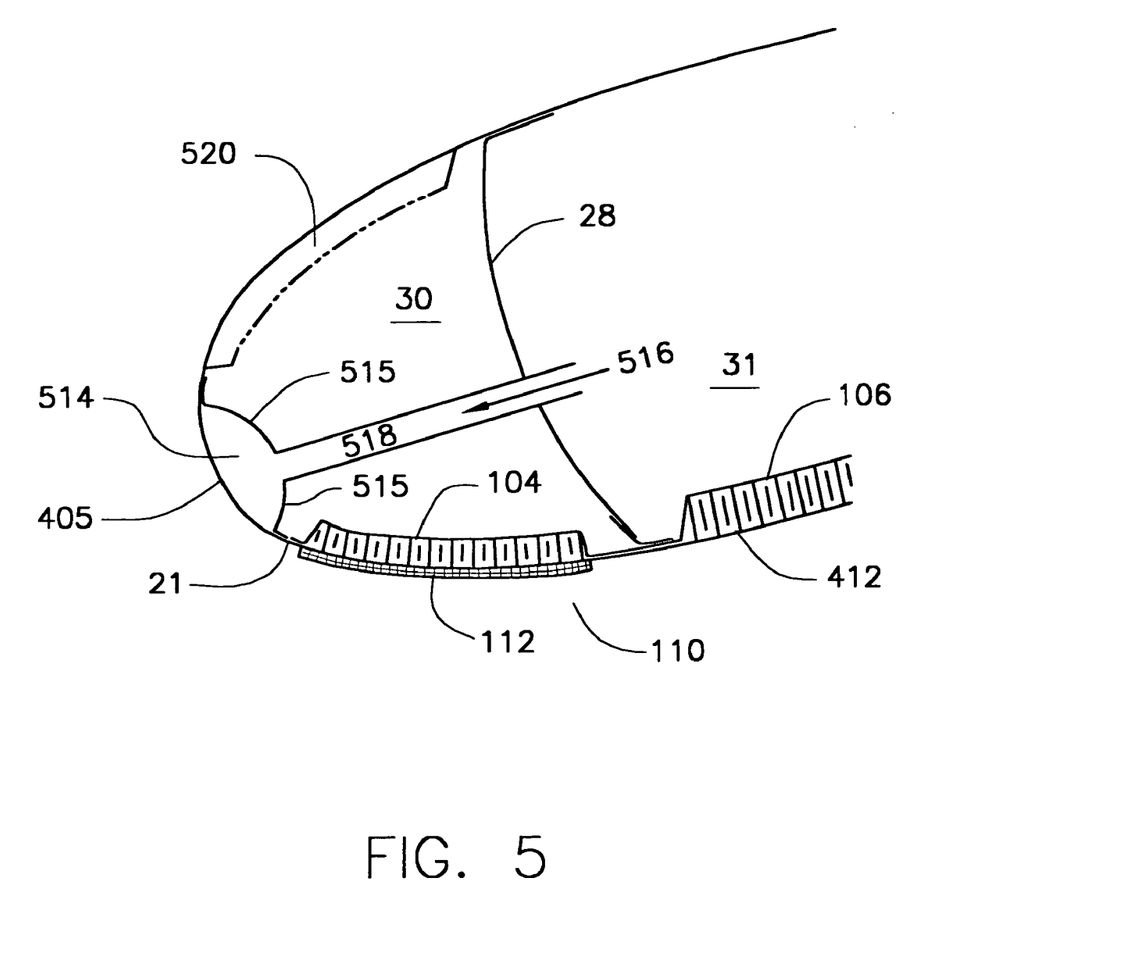
FIG. 5 depicts an alternate arrangement for nacelle inlet lip design.

Reference is now made to FIG. 5, which shows a schematic view of another embodiment of the invention in which the IPS 112 and acoustic panel 104 are used in conjunction with a bleed air system for de-icing the inlet lip area. Bulkhead 28 and inlet lip 21 define D-duct 30. The inlet lip 21 includes an acoustic inner panel 104 with the IPS 112 and its associated permeable thermal insulation (not shown) bonded to the surface of the perforated skin 110 of the acoustic panel 104, as previously described. An inlet section 514 defined by inlet walls 515 is provided, into which hot bleed air from hot air supply 516 is directed via duct 518. The hot bleed air is either vented through perforations in the lip skin or through a single overboard vent (not shown in FIG. 5) typical of the system described in U.S. Pat. No. RE 36,215. The inlet section 514 is located proximate to the most forward portion of the nacelle lip, or highlight 405, as shown. The inlet lip may also comprise a second acoustic panel 520 (shown in dashed lines). In this embodiment, the IPS 112 and hot bleed air system cooperate to provide ice protection for the inlet lip area. As shown in FIG. 5, the acoustic panel 104 is spaced from the area impacted by hot bleed air, in order to avoid any degradation of the panel by the hot air.

It should be understood that various changes and modifications to the preferred embodiments herein will be apparent to those skilled in the art. Such changes and modifications can be made without departing from the spirit and scope of this invention and without diminishing its attendant advantages. It is therefore intended that such changes and modifications be covered by the appended claims.

We claim:

1. An acoustic panel for use in the inlet lip portion of a gas turbine nacelle, the panel comprising: (a) a solid back skin; (b) an acoustically permeable front skin; (c) a honeycomb cell structure located between the front skin and back skin; and (d) an ice protection system affixed to the front skin, wherein the ice protection system includes an acoustically permeable and electrically and thermally conductive structure which includes means for connection to an electric power source, and the structure is thermally insulated from the front skin.

2. The acoustic panel of claim 1, in which the ice protection system includes a low power electronic ice protection system.

3. The acoustic panel of claim 1, in which the acoustically permeable front skin is perforated.

4. The acoustic panel of claim 1, in which the honeycomb structure is adhesively bonded to the front skin and the back skin.

5. The acoustic panel of claim 1, in which the front skin and the back skin are each an aluminum sheet material.

6. The acoustic panel of claim 1, in which the front skin, back skin and honeycomb cell structure are each a graphite/epoxy laminate.

7. The acoustic panel of claim 1, in which the ice protection system includes a stainless steel wire mesh adhesively bonded to the outer surface of the front skin.

8. The acoustic panel of claim 1, in which a permeable, thermally insulating material is located between the electronic ice protection system and the front skin.

9. The acoustic panel of claim 8, in which the insulating material is adhesively bonded to the outer surface of the front skin, and the electronic ice protection system is adhesively bonded to the insulating material.

10. The acoustic panel of claim 1, in which the nacelle has a highlight, and a patting strip is located proximate to the nacelle highlight.

11. The acoustic panel of claim 10, in which the parting strip is an electrified grid material which carries a watt density of up to about 20 W/sq. in.

12. The acoustic panel of claim 1, in which the ice protection system comprises a plurality of sections which extend around the circumference of the inlet lip of the nacelle.

13. The acoustic panel of claim 12, in which power is supplied selectively or sequentially to the sections.

14. An inlet lip for an aircraft gas turbine engine nacelle, the inlet lip comprising: (a) an acoustic panel structure including a solid back skin, an acoustically permeable front skin, and a honeycomb cell structure there between; and (b) an ice protection system located on the front skin, wherein the ice protection system includes an acoustically permeable and electrically and thermally conductive structure in electrical connection to an electric power source, and the ice protection system is thermally insulated from the permeable front skin.

* * * * *

UNITED STATES PATENT AND TRADEMARK OFFICE
CERTIFICATE OF CORRECTION

| | | |
|---|---|---|
| PATENT NO. | : 7,588,212 B2 | Page 1 of 1 |
| APPLICATION NO. | : 10/615673 | |
| DATED | : September 15, 2009 | |
| INVENTOR(S) | : Jeffrey W. Moe et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,396 days.

Signed and Sealed this
Eleventh Day of January, 2011

David J. Kappos
*Director of the United States Patent and Trademark Office*